Patented Aug. 24, 1948

2,447,975

UNITED STATES PATENT OFFICE 2,447,975

PREPARATION OF ACETAL BODIES FROM POLYHYDRIC ALCOHOLS

Willard J. Croxall, Bryn Athyn, and Harry T. Neher, Bristol, Pa., assignors to Röhm & Haas Company, Philadelphia, Pa., a corporation of Delaware No Drawing. Application January 30, 1948, Serial No. 5,494

9 Claims. (Cl. 260—338)

This invention concerns the preparation of acetal bodies.

This application is a continuation-in-part of our application Serial No. 613,034, filed August 27, 1945, now Patent No. 2,446,171 dated August 3, 1948 wherein there is disclosed the basic reaction between vinyl esters and alcohols to yield acetals.

As shown in our parent application, polyhydric alcohols react with vinyl esters in the presence of a mercury catalyst and a strongly acidic catalyst to give acetaldehyde acetal bodies. These are found to be of at least three sorts, all of which have interesting and valuable properties, rendering them useful in diverse applications. When one mole of a vinyl ester reacts with two moles of a polyhydric alcohol at a single hydroxyl group of each, there results a hydroxy-substituted acetal. If this type of acetal is reacted with additional vinyl ester, there may be formed a resin having alternate chains from the alcohol and the >CHCH₃ grouping. On the other hand, when there are two to three carbon atoms between the hydroxyl groups of a dihydric alcohol, there is obtained a cyclic acetal or dioxalane. Both hydroxy-substituted acetal and cyclic acetal are sometimes obtained from the same reaction mixture. Likewise, both hydroxy-substituted acetal and resin may be thus obtained.

As a vinyl ester, there may be used any vinyl carboxylate. The vinyl esters of monocarboxylic acids are particularly suitable and, of these, the esters of the lower aliphatic acids are preferred. Thus, vinyl acetate, vinyl propionate, and vinyl butyrate, falling within the formula

wherein R is an alkyl group of one to three carbon atoms, are generally economical and highly effective starting materials. Since the carboxylic acid portion of the ester is eliminated in the reaction, it is not ordinarily of importance.

As polyhydric alcohols, there may be used dihydric, trihydric, tetrahydric, or other alcohols. Of these, the dihydric are of particular importance. These may be simple glycols, such as ethylene glycol, propylene glycol, or trimethylene glycol, or they may be glycols with longer hydrocarbon groups as in tetramethylene glycol, hexamethylene glycol, decamethylene glycol, or the like. The glycols include the polyglycols, such as diethylene glycol, dipropylene glycol, dibutylene glycol, triethylene glycol, tetraethylene glycol, pentaethylene glycol, and higher dihydric ether alcohols of this kind, glycols with mixed alkylene groups, such as hydroxyethoxypropanol, hydroxyethoxypropoxyethanol, and thio glycols, such as thiodiethylene glycol, and the like.

The 1,2-diols and 1,3-diols are those which give cyclic acetals. Typical of these are not only ethylene glycol, propylene glycol, and trimethylene glycol, already recited as typical dihydric alcohols, but also more complex glycols, such as 1,2-butanediol, 2,3-butanediol, 1,3-butanediol, 2,2-dimethyl-1,3-propanediol, 2-tert.-butyl-2-isopropyl-1,3-propanediol, 2-isopropyl-2-ethyl-1,3-propanediol, 2-isobutyl-2-methyl-1,3-propanediol, 2-neopentyl-2-methyl-1,3-propanediol, 2-hexyl-2-methyl-1,3-propanediol, 2-ethyl-2-butyl-1,3-propanediol, 2-ethyl-1,3-pentanediol, 2-ethyl-1,3-hexanediol, 2-isopropyl-5-methyl-1,3-hexanediol, 2-methyl-2,4-pentanediol, 2-methyl-2,4-hexanediol, 2-isopropyl-2-isobutyl-5,7,7-trimethyl-1,3-octanediol, 5-isopropyl-6,6-dimethyl-2-(1'-methyl-3',3'-dimethylbutyl)-1,3-heptanediol, and the like. Thus, glycols of two to eighteen carbon atoms may be used as reactants with vinyl esters to yield acetal bodies.

The reaction is effected in the presence of both a mercury catalyst and a strongly acidic catalyst. As a mercury compound, there is preferably used a mercury oxide, such as the yellow or the red oxides, in conjunction with a strongly acidic catalyst, such as a strong mineral acid, for example, sulfuric acid, or tetraphosphoric acid, or an "ansolvo acid," illustrated by the highly effective complexes formed from boron trifluoride and an oxygenated catalyst. The oxide and acid together form in situ a most effective combination which, for practical purposes, may be regarded as both a mercury catalyst and a strongly acidic catalyst. It is not essential, however, that the combination be formed in situ, for preformed mercury salts, such as mercury sulfate, which themselves yield a strong acid, as by hydrolysis, may be used even though they are slower in action than the described combination. Other catalysts are mercury acetate-sulfate and acetate-trichloroacetate.

Complexes formed from boron trifluoride and an oxygenated organic compound are particularly valuable acidic catalysts in conjunction with a mercury compound, particularly mercury oxide. The complexes are readily soluble in the reaction mixture, produce no troublesome by-products, and are readily disposed of at the end of the reaction. Coordination complexes of boron trifluoride include $BF_3.O(C_2H_5)_2$ or $BF_3.O(C_4H_9)_2$ as typical of those derived from ethers, $BF_3.2CH_3COOH$ from carboxylic acids, $BF_3.C_2H_5OH$ or $BF_3.C_4H_9OH$ from alcohols, BF₃.CH₃COCH₃ from ketones, and so on.

There are needed but relatively small proportions of mercury catalyst and strongly acidic catalyst for the promotion of acetal formation. As small amounts as 0.5 gram of mercury compound and 0.5 gram of acidic catalyst per gram mole of vinyl ester are sufficient to give relatively rapid conversions and fair yields of acetals. Smaller amounts are effective, however, even though the yield in a given time may be less. One-gram portions of both mercury and acidic catalyst per gram mole of vinyl ester appear about optimum in respect to rate of reaction and yield, yet with due regard for economy of time, materials, and effort. Higher proportions may, however, be used, even ten-gram portions of each kind of catalyst per mole of vinyl ester being satisfactory.

The optimum ratio of vinyl ester to dihydric alcohol is mole for mole. Yet, even with a lower ratio of alcohol to vinyl ester, acetals are obtained, particularly when vinyl ester is added to alcohol. With low ratios of alcohol to vinyl ester, some hemiacetal ester is formed and is separable, particularly when less vigorous catalysts are used, such as phosphates, and when alcohol is added to vinyl ester. The hemiacetal esters are readily converted to acetals with addition of alcohol and, if desired supplementary catalysts.

The importance of the stepwise procedure lies in the preparation of mixed acetals. Thus, a hemiacetal ester,

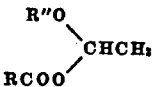

wherein R'' is a residue of an alcohol, may be formed with a given alcohol and the hemiacetal converted to an acetal by reaction with a different alcohol. In forming mixed acetals, there may be used, in addition to a polyhydric alcohol, any of the other alcohols shown in our parent application, such as methyl, ethyl, butyl, octyl, dodecyl, octadecyl, allyl, methallyl, undecenyl, oleyl, benzyl, tetrahydrofurfuryl, the various alkoxyethyl and alkoxypropyl alcohols, halohydrins, etc.

On the other hand, it is often desirable to use excess alcohol, since it serves as a solvent. Other organic solvents may be used, if desired, such as hydrocarbons or other inert organic solvent or diluent.

The reaction may be carried out from somewhat below room temperature up to water bath temperatures, in general from about 10° to about 90° C. The preferred temperature range is 30° to 60° C., although it is often desirable to use somewhat higher temperatures to help drive the reaction toward completion after the vigor of the initial stage of the reaction has subsided. Cooling is often desirable during the early stage of reaction to help in its control.

When reaction has been effected, the acidic catalyst is destroyed, as by addition of an alkaline reacting material, including both inorganic compounds and organic products such as amines and quaternary ammonium hydroxides. Alternatively, both acidic catalyst and mercury catalyst may be disposed of, as by washing the reaction mixture, particularly with an alkaline solution. The acetals may then be separated through distillation or extraction or other conventional procedure. Where resins are obtained, they remain as a residue.

The liquid acetals obtained are useful as solvents in neutral or slightly alkaline systems and as plasticizers. They may serve as fluids for transmitting power and pressure. The resins obtained are of value when dissolved in such fluids to improve the temperature-viscosity relationship of the fluid and increase the viscosity thereof.

In the following examples, there are presented typical methods of forming the several types of acetal bodies which are provided by this invention.

*Example 1*

A mixture was prepared from two grams of mercuric oxide, four milliliters of the boron trifluoride-methanol complex, and four gram moles of ethylene glycol. Thereto was added four gram moles of vinyl acetate while the temperature was held at 45° to 50° C. The reaction mixture was then neutralized with sodium carbonate, washed, and distilled. There was thus obtained the cyclic acetal boiling at 82° C., 2-methyl-1,3-dioxolane, the numbering here being based on the ring system:

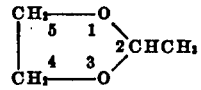

Repetition of this example with vinyl propionate or butyrate yields the identical dioxolane.

*Example 2*

A mixture was prepared from one gram of red mercury oxide, two milliliters of the boron trifluoride-methanol complex, and one gram mole of trimethylene glycol. Thereto was slowly added with stirring one gram mole of vinyl acetate with the temperature held at 50° to 55° C. Thereto was added 0.5 gram of potassium carbonate. The reaction mixture was then distilled through a short packed column. A fraction of forty grams was obtained between 85° and 95° C. which corresponded in composition to the compound:

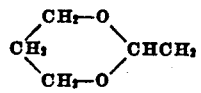

Another fraction, which was obtained at 185° to 205° C., was found to have the composition:

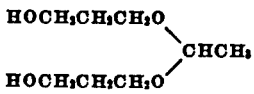

The tendency toward cyclization apparently is increased with the presence of branched alkylene groups, as in 1,2-propylene glycol, 2-methyl-2,4-pentanediol, 2,3-hexanediol, and the like.

*Example 3*

One gram mole of 2-methyl-2,4-pentanediol was taken and thereto were added one gram of yellow mercury oxide and two milliliters of boron trifluoride-butanol complex. The mixture was warmed to about 40° C. and one gram mole of vinyl acetate added thereto while the temperature of the reaction mixture was kept below about 55° C. with the aid of external cooling. The reaction mixture was stirred for an hour and neutralized with a 10% sodium carbonate solution. The amount of carbonate required indicated that the reaction had liberated 85% of the theoretical quantity of acetic acid. The organic liquid was washed, dried over a little potassium carbonate, and distilled. There was obtained a main fraction at 75°-77° C./45 mm., amounting to 92.5 grams, which corresponded in composition to the cyclic acetal:

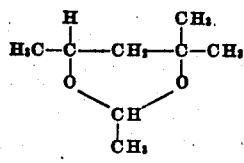

Example 4

To a stirred mixture of one gram of mercury oxide and two milliliters of boron trifluoride-methanol complex in one gram mole of 2-butyl-2-ethyl-1,3-propanediol, there was slowly added one gram mole of vinyl acetate. The reaction mixture was maintained below 60° C. during this addition and was stirred for an hour thereafter. About a half gram of potassium carbonate was then added and the reaction mixture distilled. From the acetic acid collected, it was calculated that the reaction had run to 60% of completion. The main fraction, amounting to 116 grams, was distilled at 130°–153° C. at 10 mm. pressure. It corresponded in composition to the cyclic acetal:

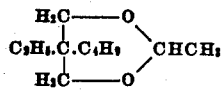

There was obtained a small fraction which showed a hydroxyl number indicating it to be the acetal from two moles of 2-butyl-2-ethyl-1,3-propanediol with two free hydroxyl groups in the acetal.

When there are more than three atoms between the hydroxyl groups, there are obtained acetals with two groups from the alcohol and resins. The following examples present typical preparations of such products.

Example 5

There were mixed one-half gram of mercury oxide and one milliliter of boron trifluoride-acetic acid complex in one gram mole of dipropylene glycol. Thereto was added with stirring one gram mole of vinyl acetate while the temperature of the reacting mixture was held below 60° C. by the aid of external cooling. A little soda ash was added, and the reaction mixture was distilled. There was a considerable residue remaining in the still pot. It was a balsam-like resin which was soluble in various acetals but relatively insoluble in common organic solvents.

Example 6

To a mixture of one gram of mercury oxide and two milliliters of boron trifluoride-methanol complex in one gram mole of diethylene glycol, there was added with stirring two gram moles of vinyl acetate while the temperature of the reaction mixture was held at 50°–55° C. with the aid of external cooling. About a half gram of potassium carbonate was added and the reaction mixture distilled. After an acetic acid fraction had been taken off, there was obtained a fraction, distilling at 155°–165° C./6–10 mm. and amounting to 120 grams. This corresponded in composition to the compound $$(HOC_2H_4OC_2H_4O)_2CHCH_3$$

This was a liquid having a viscosity of 1.292 centistokes at 210° F. and of 4.310 centistokes at 100° F. The Hardimann-Nissan viscosity index of this compound is −13. When a resinous material, such as one of the acetal linked resins formed from glycols with four or more atoms between alcoholic hydroxyl groups, is dissolved in this liquid, there is obtained a fluid which has good viscosity-temperature relationships and may be used as a hydraulic fluid.

After the volatile fractions had been removed from the reaction mixture, there was obtained as a residue a tacky resin, amounting to sixty-five grams. This resin was soluble in various acetals. For instance, a 9% solution of this resin was made in phenoxyethyl acetaldehyde acetal. This solution had a viscosity of 5.567 centistokes at 210° F. and 35.05 centistokes at 100° F., giving a viscosity index of 106. The unmodified phenoxyethyl acetal has a viscosity of 2.85 centistokes at 210 F. and of 20.93 centistokes at 100° F., giving a viscosity index of −180.

Example 7

A half gram of mercury oxide and a milliliter of boron trifluoride-methanol complex were mixed with a half gram mole of tetraethylene glycol. This mixture was held at 50° C. while a half gram mole of vinyl acetate was added. The reaction mixture was then stirred for two hours and held at 50° C. during this time. A small amount of potassium carbonate was added and the mixture subjected to distillation. A fraction of fifty grams was obtained at 225°–250° C./10 mm. which corresponded in composition to hydroxy-ethoxyethoxyethoxyethyl acetal. It is a liquid having a viscosity of 2.427 centistokes at 210° F. and of 10.15 centistokes at 100° F. There remained a non-volatile residue which was resinous in character and which set to a hard mass when cooled to room temperature.

Example 8

The reaction of hexaethylene glycol and vinyl acetate was performed as in Example 7 except that the reaction product was completely neutralized by washing with sodium carbonate solution. As in the previous example, there was obtained a resinous residue in which residues of the glycol are connected by a >CHCH₃ linkage.

Example 9

A mixture was prepared from a half gram of mercury oxide, one milliliter of boron trifluoride-methanol complex, and a half gram mole of decamethylene glycol. Thereto was added a half gram mole of vinyl acetate. The reaction mixture was stirred for several hours thereafter, treated with a half gram of potassium carbonate, and subjected to distillation. About forty grams of a product boiling above 200° C./5–10 mm. was taken off, corresponding in composition to hydroxy(polyethoxy)ethyl acetal. There remained thirty grams of resin. The liquid fraction had a viscosity of 6.902 centistokes at 210° F. and of 41.90 centistokes at 100° F., giving a viscosity index of 128.

By the same general procedure, there may be reacted other alkanediols or other dihydric alcohols. There are thus obtained cyclic acetals in cases where the alcoholic hydroxyl groups of the glycol are separated by two to three carbon atoms. From glycols with a chain of four or more atoms between hydroxyl groups, there are obtained acetal polymers which are primarily linear in nature. Along with these products, there may be obtained hydroxy-substituted acetals. The procedure is a convenient and expeditious one for obtaining both known acetals and acetal bodies which have not heretofore been available.

We claim:

1. A process for preparing acetaldehyde acetal bodies which comprises reacting between 10° and 90° C. in the presence of a strongly acidic catalyst and a mercury catalyst a vinyl ester of a saturated, aliphatic monocarboxylic acid having two to four carbon atoms and a dihydric alcohol.

2. A process for preparing acetaldehyde acetal bodies which comprises reacting between 30° and 60° C. in the presence of mercury oxide and a boron trifluoride catalyst a vinyl ester, $$RCOOCH=CH_2$$

wherein R is an alkyl group of one to three carbon atoms, and a dihydric alcohol of two to eighteen carbon atoms.

3. A process for preparing acetaldehyde acetal bodies which comprises reacting between 10° and 90° C. in the presence of mercury oxide and a boron trifluoride catalyst a vinyl ester, $$RCOOCH=CH_2$$

wherein R is an alkyl group of one to three carbon atoms, and an alkylene glycol having at least two carbon atoms between the alcoholic hydroxyl groups thereof and not more than a total of eighteen carbon atoms.

4. A process for preparing acetaldehyde acetal bodies which comprises reacting between 10° and 90° C. in the presence of mercury oxide and a boron trifluoride catalyst a vinyl ester, $RCOOCH=CH_2$, wherein R is an alkyl group of one to three carbon atoms, and an alkylene glycol having at least two carbon atoms between the alcoholic hydroxyl groups thereof and not more than a total of eighteen carbon atoms, destroying the boron trifluoride catalyst in the reaction mixture, and separating acetal bodies therefrom.

5. A process for preparing 1,3-dioxo-2-methyl cyclic acetals which comprises reacting between 10° and 90° C. in the presence of mercury oxide and a boron trifluoride catalyst a vinyl ester of the formula $RCOOCH=CH_2$, wherein R is an alkyl group of one to three carbon atoms, and a glycol having two to three carbon atoms between the alcoholic hydroxyl groups thereof, destroying the boron trifluoride catalyst in the reaction mixture, and separating therefrom a 1,3-dioxo-2-methyl cyclic acetal.

6. The process of claim 5 wherein the glycol is a 1,3-propanediol of not over eighteen carbon atoms.

7. The process of claim 6 wherein the 1,3-propanediol is 2-butyl-2-ethyl-1,3-propanediol.

8. A process for preparing acetaldehyde acetal bodies which comprises reacting between 10° and 90° C. in the presence of mercury oxide and a boron trifluoride catalyst a vinyl ester of the formula $RCOOCH=CH_2$, wherein R is an alkyl group of one to three carbon atoms, and a glycol having more than three atoms separating its alcoholic hydroxyl groups, destroying the boron trifluoride catalyst in the reaction mixture, and separating therefrom resinous acetal bodies.

9. The process of claim 8 wherein the glycol is an alkylene glycol having not over eighteen carbon atoms.

WILLARD J. CROXALL.
HARRY T. NEHER.